United States Patent

Mannava et al.

[19]

[11] Patent Number: 5,932,120
[45] Date of Patent: Aug. 3, 1999

[54] LASER SHOCK PEENING USING LOW ENERGY LASER

[75] Inventors: Seetharamaiah Mannava, Cincinnati; Todd J. Rockstroh, Maineville, both of Ohio; James G. Kelley, California, Ky.

[73] Assignee: General Electric Company, Cincinnati, Ohio

[21] Appl. No.: 08/993,194

[22] Filed: Dec. 18, 1997

[51] Int. Cl.[6] .................................................. B23K 26/00
[52] U.S. Cl. ............... 219/121.85; 148/525; 219/121.61; 219/121.84
[58] Field of Search .................................... 148/525, 565; 219/121.65, 121.66, 121.62, 121.84, 121.85, 121.61

[56] References Cited

U.S. PATENT DOCUMENTS

| | | |
|---|---|---|
| 3,576,070 | 4/1971 | Parsons . |
| 3,850,698 | 11/1974 | Mallozzi et al. . |
| 4,002,403 | 1/1977 | Mallozzi et al. . |
| 4,060,769 | 11/1977 | Mallozzi et al. . |
| 4,401,477 | 8/1983 | Clauer et al. . |
| 4,411,730 | 10/1983 | Fishter et al. . |
| 4,426,867 | 1/1984 | Neal et al. . |
| 4,539,461 | 9/1985 | Benedict et al. . |
| 4,645,547 | 2/1987 | Krause et al. . |
| 4,708,752 | 11/1987 | Kar . |
| 4,937,421 | 6/1990 | Ortiz, Jr. et al. . |
| 4,972,061 | 11/1990 | Duley et al. . |
| 5,120,197 | 6/1992 | Brooks . |
| 5,127,019 | 6/1992 | Epstein et al. . |
| 5,131,957 | 7/1992 | Epstein et al. . |
| 5,235,838 | 8/1993 | Berstein . |
| 5,306,360 | 4/1994 | Bharti et al. . |
| 5,316,720 | 5/1994 | Spiegel et al. . |
| 5,492,447 | 2/1996 | Mannava et al. . |
| 5,571,575 | 11/1996 | Takayanagi . |
| 5,756,965 | 5/1998 | Mannava ........................... 219/121.85 |

FOREIGN PATENT DOCUMENTS

WO95/25821  9/1995  WIPO .

OTHER PUBLICATIONS

American Machinist, "Laser Shocking Extends Fatigue Life", by John A. Vaccari, pp. 62–64, Jul. 1992.

Materials and Processing Report, "Laser Shock Processing Increases the Fatigue Life of Metal Parts", pp. 3–5, Sep., 1991.

*Primary Examiner*—Geoffrey S. Evans
*Attorney, Agent, or Firm*—Andrew C. Hess; Nathan D. Herkamp

[57] ABSTRACT

A method of laser shock peening a gas turbine engine object continuously firing a stationary laser beam, which repeatably pulses between relatively constant periods, on a portion of the object with a low power laser beam, on the order of 3–10 joules, to vaporize material on the surface of a portion of a part made of a strong hard metal, such as a titanium alloy. Laser pulses around small laser beam spots, on the order of 1 mm in diameter, are used to vaporize material on the surface of the portion of the object with the pulses around laser beam spots formed by the laser beam on the surface and form a region having deep compressive residual stresses extending into the object from the laser shock peened surface. Flowing a curtain of water over the surface upon which the laser beam is firing while preferably moving the object until the laser shock peened surface is completely covered by laser beam spots at least once. The surface may be coated with an ablative coating such as a paint which is suitable to produce the plasma or the surface may be unpainted and the metal of the object is used to produce the plasma.

21 Claims, 5 Drawing Sheets

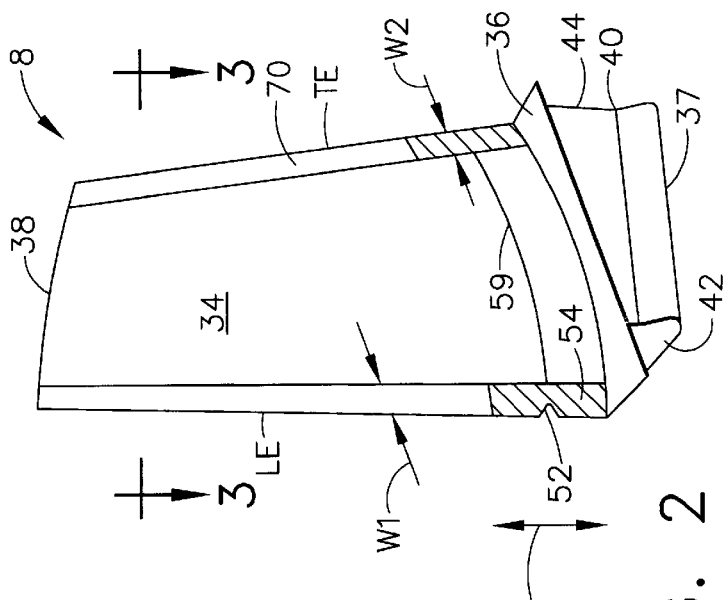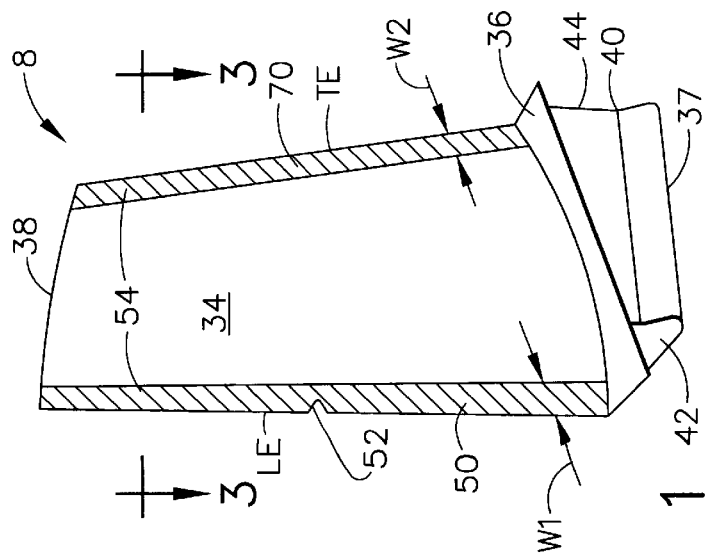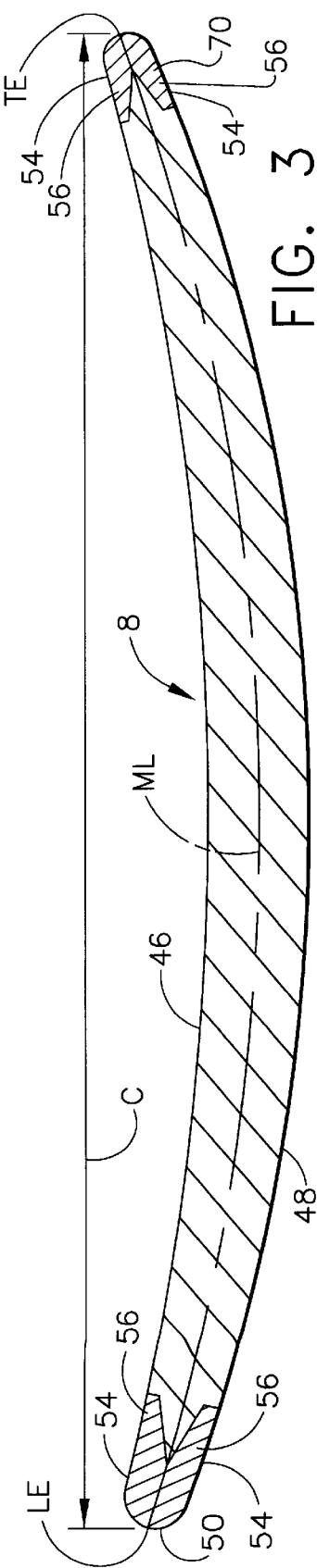

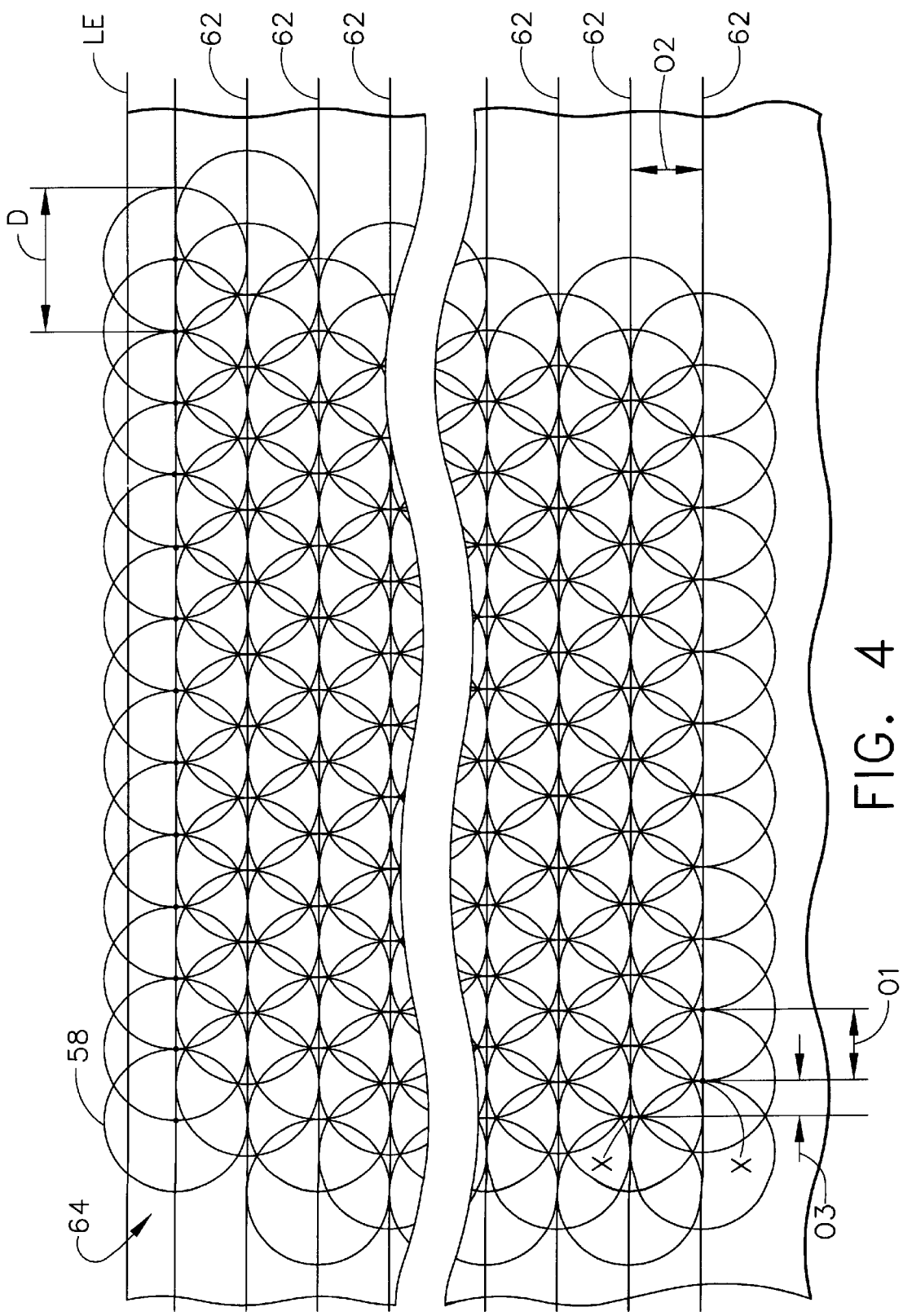

LASER SHOCK PEENING USING LOW ENERGY LASER

RELATED PATENT APPLICATIONS

The present Application deals with related subject matter in co-pending U.S. patent application Ser. Nos. 08/993,197, pending, entitled "RIPSTOP LASER SHOCK PEENING"; 08/362,362, pending, "ON THE FLY LASER SHOCK PEENING", filed Dec. 22, 1994; and U.S. Pat. Nos.: 5,591,009, entitled, "Laser shock peened gas turbine engine fan blade edges"; 5,569,018, entitled, "Technique to prevent or divert cracks"; 5,531,570, entitled, "Distortion control for laser shock peened gas turbine engine compressor blade edges"; 5,492,447, entitled, "Laser shock peened rotor components for turbomachinery" all of which are assigned to the present Assignee.

BACKGROUND OF THE INVENTION

1. Field of the Invention

This invention relates to laser shock peening of hard metallic gas turbine engine parts and, more particularly, for using low energy lasers and small laser spots to laser shock peen portions of objects such as airfoil leading and trailing edges such as found on fan and compressor blades to form laser shock peened regions having localized compressive residual stresses imparted by laser shock peening.

2. Description of Related Art

Gas turbine engines and, in particular, aircraft gas turbine engines rotors operate at high rotational speeds that produce high tensile and vibratory stress fields within the blade and make the fan blades susceptible to foreign object damage (FOD). Vibrations may also be caused by vane wakes and inlet pressure distortions as well as other aerodynamic phenomena. This FOD causes nicks and tears and hence stress concentrations in leading and trailing edges of fan blade airfoils. These nicks and tears become the source of high stress concentrations or stress risers and severely limit the life of these blades due to High Cycle Fatigue (HCF) from vibratory stresses. These and other operational phenomena lead to incipient cracking and material failure of portions of objects such as along airfoil edges.

Therefore, it is highly desirable to design and construct longer lasting fan and compressor blades, as well as other hard metallic parts, that are better able to resist both low and high cycle fatigue and that can arrest cracks than present day parts. The above referenced U.S. Patent Applications are directed towards this end. They teach to provide an airfoil of a fan blade with regions of deep compressive residual stresses imparted by laser shock peening on at least a radially extending portion of leading and/or trailing edge surfaces of the fan blade.

The region of deep compressive residual stresses imparted by laser shock peening of the present invention is not to be confused with a surface layer zone of a work piece that contains locally bounded compressive residual stresses that are induced by a hardening operation using a laser beam to locally heat and thereby harden the work piece such as that which is disclosed in U.S. Pat. No. 5,235,838, entitled "Method and apparatus for truing or straightening out of true work pieces". The prior art teaches the use of multiple radiation pulses from high powered pulsed lasers and large laser spot diameters of about 1 cm to produce shock waves on the surface of a work piece similar to the above referenced Patent Applications and U.S. Pat. No. 3,850,698, entitled "Altering Material Properties"; U.S. Pat. No. 4,401,477, entitled "Laser shock processing"; and U.S. Pat. No. 5,131,957, entitled "Material Properties". Laser shock peening as understood in the art and as used herein, means utilizing a laser beam from a laser beam source to produce a strong localized compressive force on a portion of a surface. Laser peening has been utilized to create a compressively stressed protection layer at the outer surface of a workpiece which is known to considerably increase the resistance of the workpiece to fatigue failure as disclosed in U.S. Pat. No. 4,937,421, entitled "Laser Peening System and Method". Manufacturing costs of the laser shock peening process is a great area of concern because startup and operation costs can be very expensive. The "on the fly" laser shock peening process disclosed in Ser. No. 08/362,362, pending, above is designed to provide cost saving methods for laser shock peening as is the present invention. However, this prior art teaches to use large laser spots, on the order of 1 cm and greater in diameter, and high powered lasers. Manufacturers are constantly seeking methods to reduce the time, cost, and complexity of such processes and it is to this end that the present invention is directed.

SUMMARY OF THE INVENTION

The method of the present invention includes uses a low power laser beam, on the order of 3–10 joules, to vaporize material on the surface of a portion of a part made of a strong hard metal, such as a titanium alloy. Laser pulses around small laser beam spots, on the order of 1 mm in diameter, are formed by the laser beam on the surface and a region having deep compressive residual stresses imparted by the laser shock peening process extend into the part from the laser shock peened surface. The method further includes flowing a curtain of water over the surface upon which the laser beam is firing while moving the part until the laser shock peened surface is completely covered by laser beam spots at least once. The surface is preferably covered by a paint which serves as an ablative material used to produce the plasma or the surface may be unpainted and the metal of the part is used to produce the plasma.

The present invention is preferably practiced as an "on the fly" method for laser shock peening a gas turbine engine part by continuously moving the metallic gas turbine engine part while continuously firing the stationary laser beam, which repeatably pulses between relatively constant periods, on a portion of the part. The method further includes flowing a curtain of water over the surface upon which the laser beam is firing while moving the part until the laser shock peened surface is completely covered by laser beam spots at least once.

The part may be moved linearly to produce at least one row of overlapping circular laser beam spots having generally equally spaced apart linearly aligned center points and the part may be moved and the laser beam fired to produce more than one row of overlapping circular laser beam spots having generally equally spaced apart linearly aligned center points wherein adjacent rows of spots overlap. The laser beam may be fired and the part moved so that the center points of adjacent spots in adjacent rows are also offset from each other a generally equal amount in a direction along a line on which the center points are linearly aligned.

In another embodiment of the present invention, the painted laser shock peened surface is laser shock peened using a set of sequences in which each sequence the surface is painted and then the part is continuously moved while continuously firing a stationary laser beam on the surface such that adjacent laser shock peened circular spots are hit in different ones of the sequences in the set. In a more particular embodiment, the laser beam is fired and the part moved so that the center points of adjacent spots in adjacent rows are offset from each other a generally equal amount in a direction along a line on which the center points are linearly aligned. A more particular embodiment, each spot is hit more than one time using more than one set of the sequences.

A more particular embodiment of the present invention uses the methods above on a gas turbine engine blade such as on the airfoil of a vane or blade of a fan or compressor section having an airfoil with a leading edge and a trailing edge. The invention may be used along a portion of the edge or along the entire edge of the airfoil such that the laser shock peened surface is at least a part of one of the edges extending radially along at least a portion of and chordwise from the edge.

ADVANTAGES

Among the advantages provided by the present invention is a faster and more cost efficient method to laser shock peen surfaces of portions of gas turbine engine parts and in particular blades designed to operate in high tensile and vibratory stress fields which can better withstand fatigue failure due to nicks and tears in the leading and trailing edges of the fan blade and have an increased life over conventionally constructed fan blades. A laser shock peening production line may be set up less expensively as compared to those suggested in the prior art, due to lower capital outlay, and the line should be less complex to develop, design, and construct because the method of the present invention uses low powered lasers. Another advantage of the present invention is that fan and compressor blades can be constructed with cost efficient methods to provide commercially acceptable life spans without increasing thicknesses along the leading and trailing edges, as is conventionally done. The present invention can be advantageously used to refurbish existing fan and compressor blades with a low cost method for providing safe and reliable operation of older gas turbine engine fan blades while avoiding expensive redesign efforts or frequent replacement of suspect fan blades as is now often done or required.

BRIEF DESCRIPTION OF THE DRAWINGS

The foregoing aspects and other features of the invention are explained in the following description, taken in connection with the accompanying drawings where:

FIG. 1 is a perspective illustrative view of an exemplary aircraft gas turbine engine fan blade laser shock peened in accordance with a method of the present invention.

FIG. 2 is a perspective illustrative view of an alternative aircraft gas turbine engine fan blade including a laser shock peened radially extending portion of the leading edge in accordance with the present invention.

FIG. 3 is a cross sectional view through the fan blade taken along line 3—3 as illustrated in FIG. 2.

FIG. 4 is a schematic illustration of a pattern of laser shocked peened circular spots on a laser shock peened surface along a leading edge of the fan blade in FIG. 2.

DETAILED DESCRIPTION OF THE INVENTION

Figure 5:
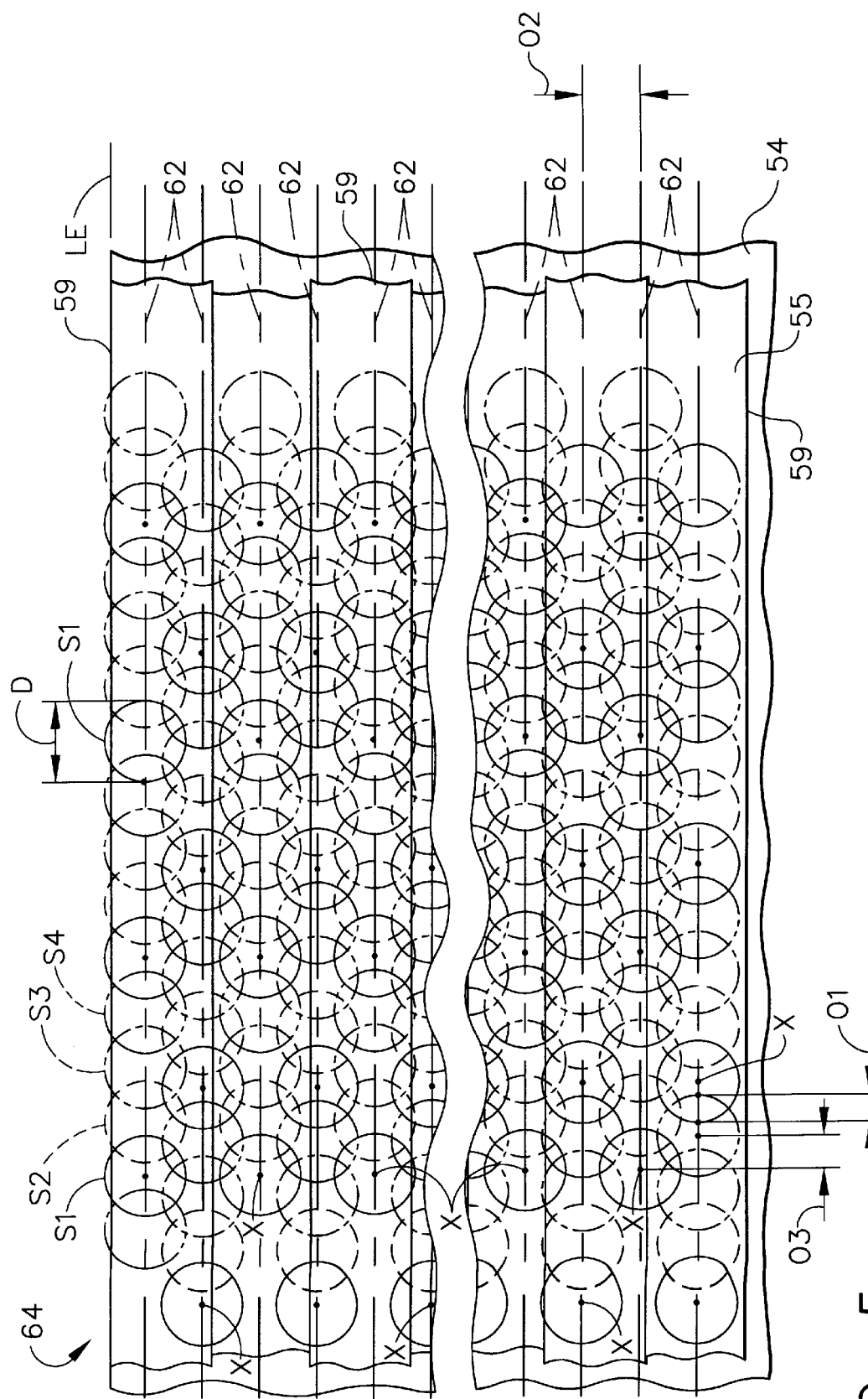
FIG. 5 is a schematic illustration of a particular pattern having four sequences of laser shocked peened circular spots that don't overlap within a given sequence on a laser shock peened surface along a leading edge of the fan blade in FIG. 2.

Illustrated in FIGS. 1, 2 and 3, is a fan blade 8 having an airfoil 34 made of a Titanium alloy extending radially outward from a blade platform 36 to a blade tip 38. This is representative of the type of hard metallic part and material that the method of the present invention was developed to be used on. The fan blade 8 includes a root section 40 extending radially inward from the platform 36 to a radially inward end 37 of the root section 40. At the radially inward end 37 of the root section 40 is a blade root 42 which is connected to the platform 36 by a blade shank 44. The airfoil 34 extends in the chordwise direction between a leading edge LE and a trailing edge TE of the airfoil. A chord C of the airfoil 34 is the line between the leading LE and trailing edge TE at each cross section of the blade as illustrated in FIG. 3. A pressure side 46 of the airfoil 34 faces in the general direction of rotation as indicated by the arrow and a suction side 48 is on the other side of the airfoil and a mean-line ML is generally disposed midway between the two faces in the chordwise direction.

The fan blade 8 has a leading edge section 50 that extends along the leading edge LE of the airfoil 34 from the blade platform 36 to the blade tip 38. The leading edge section 50 includes a predetermined first width W1 such that the leading edge section 50 encompasses nicks 52 and tears that may occur along the leading edge of the airfoil 34. The airfoil 34 subject to a significant tensile stress field due to centrifugal forces generated by the fan blade 8 rotating during engine operation. The airfoil 34 is also subject to vibrations generated during engine operation and the nicks 52 and tears operate as high cycle fatigue stress risers producing additional stress concentrations around them.

Figure 6:
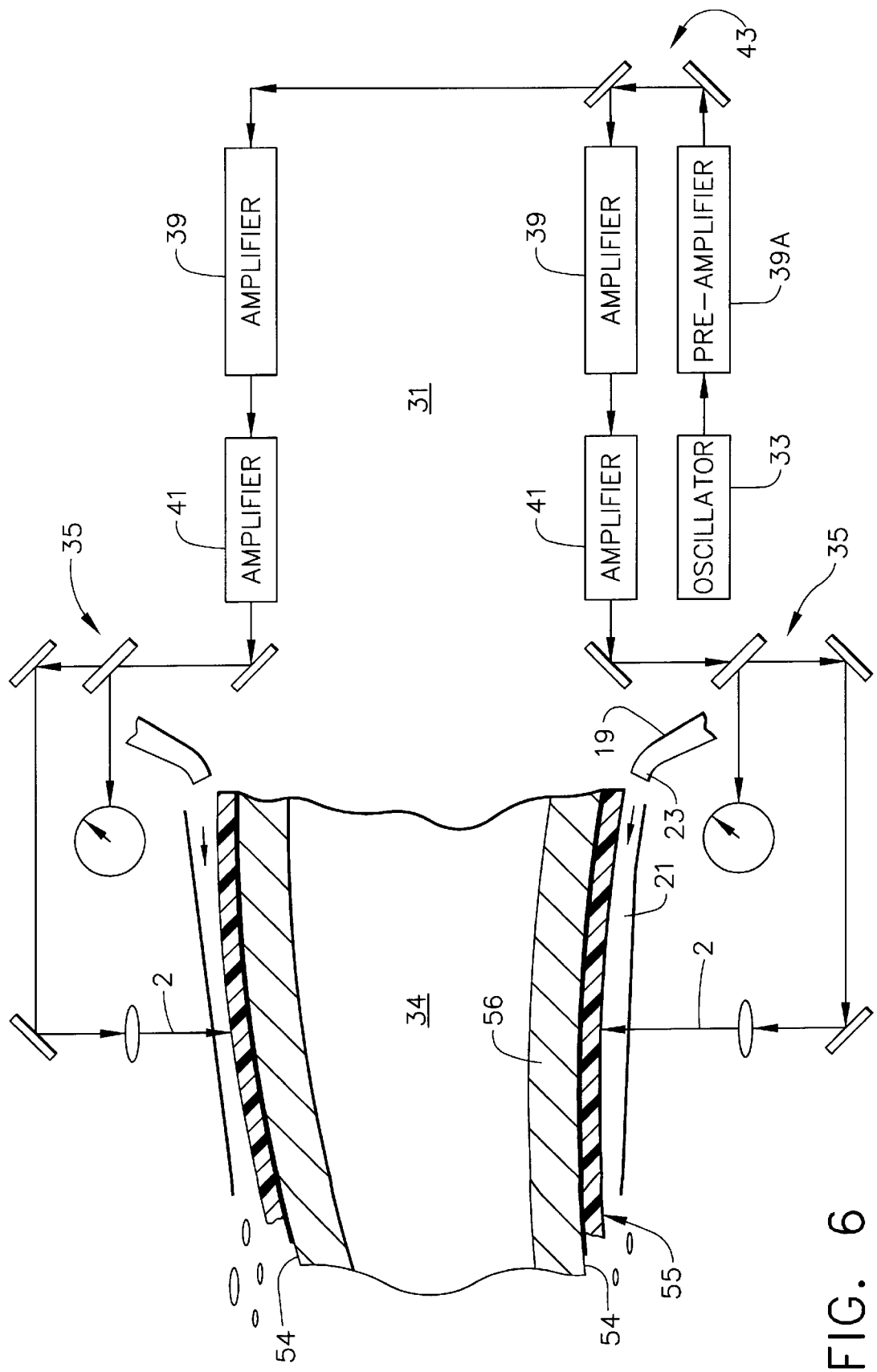
FIG. 6 is a schematical perspective view of the blade of FIG. 1 painted and mounted in a laser shock peening system illustrating the method of the present invention.

To counter fatigue failure of portions of the blade along possible crack lines that can develop and emanate from the nicks and tears at least one and preferably both of the pressure side 46 and the suction side 48 have a laser shock peened surfaces 54 and a pre-stressed region 56 having deep compressive residual stresses imparted by a laser shock peening (LSP) method in accordance with the present invention. The present method uses low power lasers having an output in a range of about 3–10 joules, with a preferred range of about 3–7 Joules, and a more preferred power of about 3 Joules, focused to produce small diameter laser spots 58 having a diameter D in a range of about 1 mm (0.040 in.) to 2 mm (0.080 in.) on the laser shock peened surface as illustrated in FIGS. 4 and 5. The lower power range has shown very good results while the 3 Joule laser is quite adaquate, produces good laser shock peening results, and is verry economical to use, procure, and maintain. This results in a surface laser energy density of approximately 400 Joules/cm$^2$ down to 100 Joules/cm$^2$, respectively. This creates the prestressed region 56 extending into the airfoil 34 from the laser shock peened surfaces as seen in FIGS. 3 and 6. A laser pulse temporal profile is preferably on the order of 20 to 30 nanoseconds in duration and the rise time preferably less than about 10 nanoseconds with a preferred amount of about 4 nanoseconds nominally. Shorter pulse temporal conditions have been found to enhance the LSP effect, producing compressive residual stresses deeper into the component. Satisfactory results have been demonstrated with a laser pulse temporal profile of approximately 45 nanoseconds in duration with a leading edge rise time of 24 nanoseconds. This temporal profile appears to be relatively long to effect LSP.

Nonetheless, low energy lasers, with relatively poor pulse temporal parameters, appear to produce compressive residual stress deep into the component. Compressive stress has been measured at 0.75 mm (0.030 in.) into the specimen treated with a low energy laser. This compares with the 0.254 mm (0.010 in.) limit of shot peening and the depths reported elsewhere for high energy lasers approaching 1.27 mm (0.050 in.) in depth. The penetration depth of a low energy laser can be improved when the leading edge temporal rise time is shortened which in turn also shortens the pulse duration as the sharper rise time initiates the blast wave faster and increases the blast wavefront energy and resulting pressure. It is expected that a 3 Joule laser used with a rise time of 5 nanoseconds can produce compressive stresses in excess of 1.27 mm (0.050 in.) into the metallic surface.

Preferably, the pre-stressed regions 56 are coextensive with the leading edge section 50 in the chordwise direction to the full extent of width W1 and are deep enough into the airfoil 34 to coalesce for at least a part of the width W1. The pre-stressed regions 56 are shown coextensive with the leading edge section 50 in the radial direction along the leading edge LE but may be shorter. The laser beam shock induced deep compressive residual stresses in the compressive prestressed regions 56 are generally about 50–150 KPSI (Kilo Pounds per Square Inch) extending from the laser shocked surfaces 54 to a depth of about 20–50 mils into laser shock induced compressive residually stressed regions 56. The laser beam shock induced deep compressive residual stresses are produced by repetitively firing two high energy laser beams 2, each of which is defocused ± a few mils with respect to the surfaces 54 on both sides of the leading edge LE which are covered with paint 55. The entire laser shock peened surfaces 54 may be formed by overlapping of the laser shocked peened circular spots 58 as illustrated in FIGS. 4 and 5.

Figure 7:
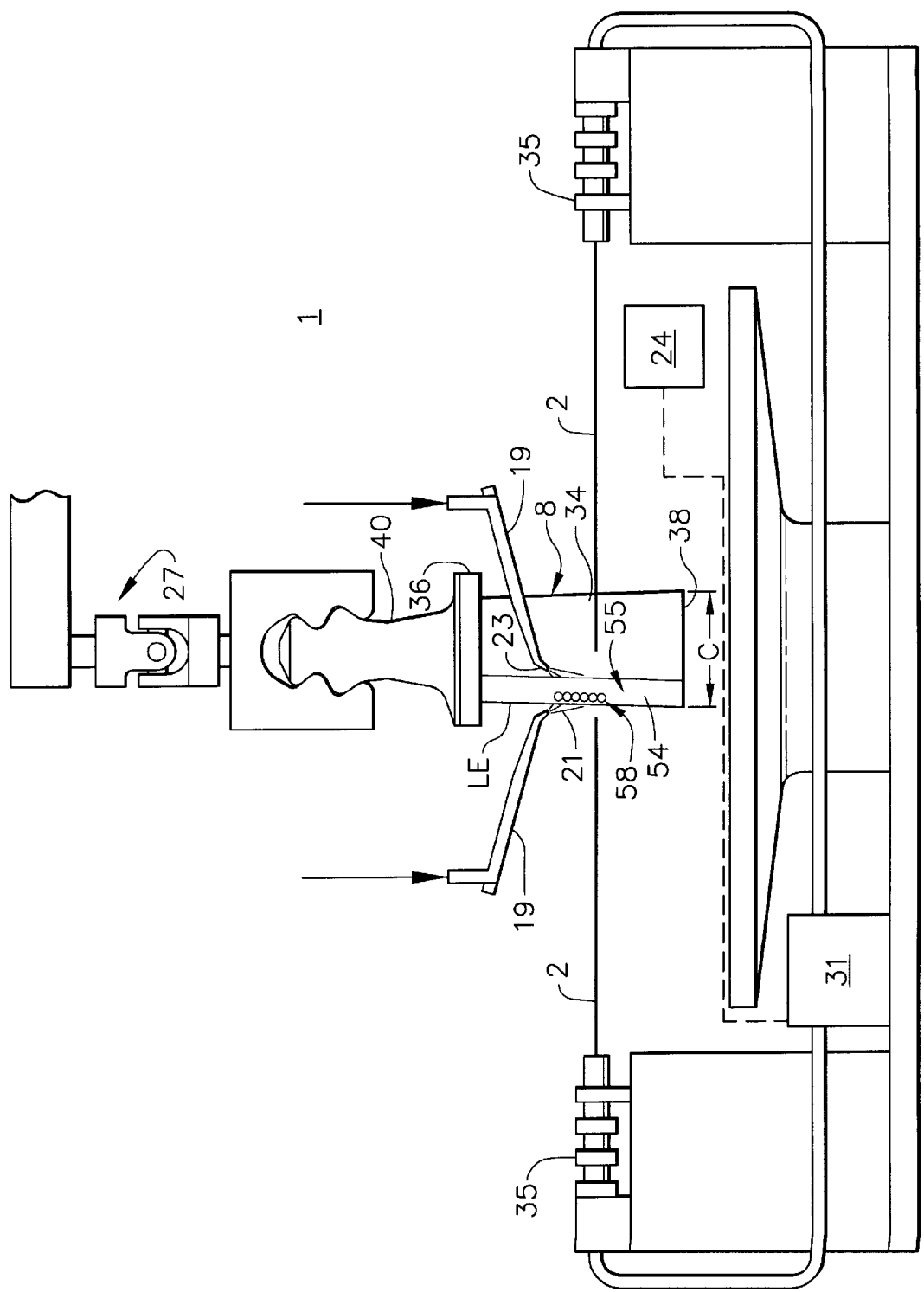
FIG. 7 is a partial cross-sectional and a partial schematic view of the setup in FIG. 6.

Referring to FIGS. 6 and 7, the laser beam shock induced deep compressive residual stresses are produced by repetitively firing two low energy laser beams 2, each of which is defocused ± a few mils with respect to the surfaces 54 on both sides of the leading edge LE which are covered with paint 55. The laser beam is preferably fired through a curtain of flowing water that is flowed over the coated or painted laser shock peened surface 54. The paint is ablated generating plasma which results in shock waves on the surface of the material. Other ablative materials may used as a suitable alternative for paint such as metallic foil or adhesive plastic tape. These shock waves are re-directed towards the coated surface by the curtain of flowing water to generate travelling shock waves (pressure waves) in the material below the coated surface. The amplitude and quantity of these shockwave determine the depth and intensity of compressive stresses. The paint is used to protect the target surface and also to generate plasma. Illustrated in FIGS. 6 and 7 is a shock peening apparatus 1 which has the blade 8 mounted in a conventionally well known robotic arm 27 used to continuously move and position the blade to provide laser shock peening "on the fly" in accordance with one embodiment of the present invention. The laser shock peened surfaces 54 on both the pressure and suction sides 46 and 48, respectively of the leading edge LE are painted with an ablative paint 55. Then the blade 8 is continuously moved while continuously firing the stationary laser beams 2 through a curtain of flowing water 21 on the surfaces 54 and forming overlapping laser shock peened circular spots 58. The curtain of flowing water 21 is illustrated as being supplied by a conventional water nozzle 23 at the end of a conventional water supply tube 19. The laser shock peening apparatus 1 has a conventional generator 31 with an oscillator 33 and a pre-amplifier 39A and a beam splitter 43 which feeds the pre-amplified laser beam into two beam optical transmission circuits each having a first and second amplifier 39 and 41, respectively, and optics 35 which include optical elements that transmit and focus the laser beam 2 on the laser shock peened surfaces 54. A controller 24 may be used to modulate and control the shock peening apparatus 1 to fire the laser beams 2 on the laser shock peened surfaces 54 in a controlled manner. Ablated paint material is washed out by the curtain of flowing water.

The laser may be fired sequentially "on the fly" so that the laser shock peened surface 54 is laser shock peened with more than one sequence of painting the surface, as illustrated in FIGS. 4 and 5, and then continuously moving the blade while continuously firing the laser beam on the surface such that adjacent laser shock peened circular spots are hit in different sequences. FIG. 4 illustrates the overlapping of all laser shocked peened circular spots with the small diameters D in a range of about 1 mm (0.040 in.) to 2 mm (0.080 in.) in a first pattern for which the spot's corresponding centers X are spaced 1 diameter D apart along a row centerline 62 and the row centerline 62 are spaced 1 diameter D apart.

FIG. 5 illustrates a second patterns of laser shocked peened circular spots 58 (indicated by the circles) and also how a number (four in this exemplary embodiment) of sequences S1 through S4 of painting (ablative coating) and on the fly laser shock peening may be used to laser shock peen the blade leading edge. The S1 sequence is shown as full line circles, as opposed to dotted line circles of the other sequences, to illustrate the feature of having non adjacent laser shocked peened circular spots 58 with their corresponding centers X along a row centerline 62. The pattern of sequences entirely covers the laser shock peened surface 54. The laser shocked peened circular spots 58 have a diameter D in a row 64 of overlapping laser shock peened circular spots. The pattern may be of multiple overlapping rows 64 of overlapping shock peened circular spots on the laser shock peened surfaces 54. A first overlap is between adjacent laser shock peened circular spots 58 in a given row and is generally defined by a first offset O1 between centers X of the adjacent laser shock peened circular spots 58 and can vary from about 30%–50% or more of the diameter D. A second overlap is between adjacent laser shock peened circular spots 58 in adjacent rows and is generally defined by a second offset O2 between adjacent row centerlines 62 and can vary from about 30%–50% of the diameter D depending on applications and the strength or fluency of the laser beam. A third overlap in the form of a linear offset O3 between centers X of adjacent laser shock peened circular spots 58 in adjacent rows 64 and can vary from about 30%–50% of the diameter D depending on a particular application.

This method is designed so that only virgin or near virgin paint is ablated away without any appreciable effect or damage on the surface of the airfoil. This is to prevent even minor blemishes or remelt due to the laser which might otherwise cause unwanted aerodynamic effects on the blade's operation. Several sequences may be required to cover the entire pattern and re-painting of the laser shock peened surfaces 54 is done between each sequence of laser firings. The laser firing each sequence has multiple laser firings or pulses with a period between firings that is often referred to a "rep". During the rep the part is moved so that the next pulse occurs at the location of the next laser shocked peened circular spot 58. Preferably, the part is moved continuously and timed to be at the appropriate location at the pulse or firing of the laser beam. One or more repeats of each sequence may be used to hit each laser shocked peened circular spot 58 more than once. This may also allow for less laser power to be used in each firing or laser pulse.

One example of the present invention is a fan blade 8 having an airfoil about 11 inches long, a chord C about 3.5 inches, and laser shock peened surfaces 54 about 2 inches long along the leading edge LE. The laser shock peened surfaces 54 are about 0.5 inches wide (W1). Four sequences of continuous laser firings and blade movement are used. The firings between reps of the laser are done on spots 58 which lie on unabated painted surfaces which requires a repaint between each of the sequences. Each spot 58 is hit three times and, therefore, three sets of four sequences are used for a total of twelve paint and repaints of the laser shock peened surface 54.

The number of sequences is not meant to be a limitation of the claimed process but rather is an exemplary embodiment of the present invention. The laser shock peening process starts with the first sequence S1 where every fourth spot is laser shock peened on sequence S1 along a given row and offset along adjacent rows, while the blade is continuously moved and the laser beam is continuously fired or pulsed and the laser. The part is timed to move between adjacent laser shock peened spots in the given sequence such as S1. The timing coincides with the rep between the pulses of the continuous laser firing on the blade. All rows of the overlapping laser shocked peened circular spots 58 contain spots of each sequence spaced apart a distance so that other laser shock peened circular spots of the same sequence don't effect the paint around it. In between sequence S1 and sequence S2, the entire area of the laser shock peened surfaces 54 to be laser shock peened is repainted. The repainting steps avoid any of the bare metal of the laser shock peened surface from being hit directly with the laser beam. It has also been found desirable to laser shock peen each spot 58 up to 3 or more times. If each spot 58 is hit 3 times then 1 paint and 11 repaints is required for three sets of four sequences S1–S4 for a total of 12 paintings.

It has been found that the part can be laser shock peened without any paint using on the fly laser shock peening which saves a considerable amount of time by not having to repaint. Furthermore, since it is often desired to laser shock peen each surface more than once and, in particular, three times. It is possible to save twelve paintings of the surface by laser shock peening without any paint at all. The plasma that is created is made up of the metal alloy material of the blade or part itself. In such a case, a remelt will be left on the laser shock peened area after the laser shock peening or pulsing part of the process is completed. This remelt will usually have to be removed in any one of many well known processes such as by mechanical or chemical removing of the layer. The usefulness of a non-painted part with on the fly laser shock peening will depend on the thickness of the part and careful attention must particularly be given to thin airfoil leading and trailing edges. It should be noted that the plasma and the metal alloy without paint rehardens and forms what is known as a remelt and therefore will require a removal in one of the well known fashions.

The no paint "on the fly" laser shock peening process of the present invention forms the above mentioned plasma with metal alloy on the surface of the airfoil and a single continuous sequence of overlapping spots 58 may be used, as illustrated in FIG. 6, for as many rows as desired. After the laser shock peening process is done the laser shock peened surface may be removed to a depth sufficient to remove the remelt that forms on the surface that might interfere with the airfoils operation.

Referring more specifically to FIGS. 1–3, the present invention includes laser shock peening either the leading edge LE or the trailing edge TE sections or both the leading edge LE and the trailing edge TE sections of the fan blade 8 to produce laser shock peened surfaces 54 and associated pre-stressed regions 56 with deep compressive residual stresses imparted by laser shock peening (LSP) as disclosed above. The laser shocked surface and associated pre-stressed region on the trailing edge TE section is constructed similarly to the leading edge LE section as described above. Nicks on the leading edge LE tend to be larger than nicks on the trailing edge TE and, therefore, the first width W1 of the leading edge section 50 may be greater than a second width W2 of the trailing edge section 70 which may also be laser shock peened. By way of example W1 may be about 0.5 inches and W2 may be about 0.25 inches. Referring again to FIG. 2, it may be desirable to laser shock peen only a portion L1 of the LE to TE instead of its entire length as shown in FIG. 1.

FIG. 2 illustrates the invention for a partial leading edge length pre-stressed regions 56 extending over a laser shock peened surface length L1 of the leading edge LE that is generally centered about a predetermined nodal line 59 where it intercepts the leading edge LE. Preferably, the nodal line 59 is one of a dominant failure mode due to vibratory stress. This stress may be due to excitations of the blade in bending and torsional flexure modes. The dominant failure mode may not always be the maximum stress mode but rather a lower stress mode or combination of modes that exist for longer durations over the engine's mission. By way of example the predetermined nodal line 59 illustrated in FIG. 2 is due to a first flex mode. A nick 52 located in this area of the leading edge LE has the greatest potential for failing the blade under resonance in this mode. Further by way of example, the laser shock peened surface length L1 of the partial leading edge length prestressed regions 56 may extend along the leading edge LE about 20% of the fan blade length from the tip 38 to the platform 36.

The present invention uses laser beams with lower energies than has yet been disclosed and these beams can be produced using different laser materials such as neodymium doped yttrium aluminum garnet (Nd YAG), Nd:YLF, and others. The advantage of these lower energy lasers is that they can pulse at significantly higher rates, several pulses per second and they are off-the-shelf lasers presently available from commercial vendors.

By way of example: for a comparable 200 Joules/cm$^2$ surface energy density, a 50 J high energy laser produces a pulse every 4 seconds and covers an area of 0.25 cm$^2$ per pulse. A 3 Joule low energy laser, such as that of the present invention, produces 10 pulses per second and covers an area of 0.015 cm$^2$. The result is an area 16.7 times smaller than the high energy pulse, but the 3 Joule low energy laser has a pulsing rate 40 times that of the higher energy laser. The net effect is a 2.4 times improvement in the overall area coverage in a given time period of laser shock peening using the lower energy laser.

One particularly useful type of laser is an Excimer type laser which use gaseous mediums that lase in the ultraviolet regime. These lasers deliver the nanosecond pulse durations and are currently approaching 10 Joules per pulse, and have the potential to impact throughput that is significant at either small or medium spot sizes on the laser shock peened surface. Furthermore, the ultraviolet radiation interaction with hard aircraft engine alloys involves less thermal transport and is analogous to an ablation process wherein material is detached from the lattice structure versus melting and vaporization. This feature can be significant in laser shock peening process where surface damage (melting and resolidification) can more than offset any improved characteristics imparted from the laser shock peening process. The ultraviolet radiation may minimize or eliminate the need for external coatings to protect the surface which are currently believed to be required for Nd:Glass laser shock peening.

Another advantage of using low energy lasers is that they are typically more robust industrial tools. Typically, a maintenance cycle for a low energy lamp pumped laser may be in excess of one million pulses and can approach tens of millions of pulses. A typical maintenance cycle for the high energy laser is about tens of thousands of shots, approaching 50 thousand. Thus, factoring in the 16.7 times the number of pulse required for the low energy laser and a conservative maintenance cycle of 10 million pulses versus a 50 thousand pulse maintenance cycle for the high energy laser, the low energy laser should require service less often than the high power laser, perhaps by a factor of 10.

Another advantage of the low energy laser that is more difficult to factor is the complexity of the system. The low energy laser will have three or four small laser heads, 6 or 8 flash lamps and comparably smaller power supplies. The high energy laser may have a minimum of 5 heads, four of which will be relatively large and correspondingly large power supplies and 10 to 18 flash lamps. Some high energy lasers disclosed elsewhere, have as many as 14 heads, 10 large power supplies, and will exceed 40 flash lamps (a high maintenance item in any laser system). Any laser process depends on the successful functioning of all elements of the system: heads, lamps, power supplies and controllers. The sheer number of wearable parts in the high energy lasers and the long term number of pulses required to process large quantities of components, make the reliability of the high energy laser suspect, relative to the less complex low energy laser.

Another advantage of the low energy laser is cost and delivery. One illustrative comparison found that the low energy laser can be procured in approximately 90 days from one of several vendors at a cost of approximately $100,000. A typical LSP system would require two low energy lasers for a total cost of $200,000. The high energy lasers were approximated to cost in excess of $1,000,000 and can approach $4,000,000 and could require over 6 months and sometimes over a year to acquire. Being specialized designs, the high energy lasers require specialized spare parts that can also require long lead time items and are more expensive.

While the preferred embodiment of the present invention has been described fully in order to explain its principles, it is understood that various modifications or alterations may be made to the preferred embodiment without departing from the scope of the invention as set forth in the appended claims.

We claim:

1. A method of laser shock peening a hard metallic object, said method comprising the following steps:
using a laser beam with a power of between 3–10 joules to vaporize material on a laser shock peened surface on a portion of the object,
the laser beam is fired with the pulses around laser beam spots having a diameter of about 1 mm formed by the laser beam on the surface to form a region having deep compressive residual stresses extending into the object from the laser shock peened surface, and
flowing a curtain of water over the surface upon which the laser beam is firing.

2. A method as claimed in claim 1 further comprising using a temporal profile of each pulse having a duration in a range of about 20 to 30 nanoseconds and a rise time less than about 10 nanoseconds.

3. A method as claimed in claim 2 wherein the rise time is about 4 nanoseconds and the power of the laser is about 3 joules.

4. A method as claimed in claim 1 wherein the object is moved linearly to produce at least one row of overlapping circular laser beam spots having generally equally spaced apart linearly aligned center points.

5. A method as claimed in claim 1 wherein the object is moved and the laser beam is fired to produce more than one row of overlapping circular laser beam spots having generally equally spaced apart linearly aligned center points wherein adjacent rows of spots overlap.

6. A method as claimed in claim 5 wherein the laser beam is fired and the object moved so that the center points of adjacent spots in adjacent rows are offset from each other a generally equal amount in a direction along a line on which the center points are linearly aligned.

7. A method as claimed in claim 5 wherein the object is not painted before the step of continuously firing a stationary laser beam such that the material on the surface used to generate a plasma which results in shock waves to form the region having deep compressive residual stresses is a metal of the metallic gas turbine engine object and the method further comprises a step of removing remelt formed on the surface by the laser firing.

8. A method as claimed in claim 5 wherein the laser shock peened surface is laser shock peened using a set of sequences wherein each sequence comprises coating the surface such that the material on the surface is a coating suitable to generate a plasma which results in shock waves to form the region having deep compressive residual stresses and then continuously moving the object while continuously firing a stationary laser beam on the surface such that adjacent laser shock peened circular spots are hit in different ones of said sequences in said set.

9. A method as claimed in claim 8 comprising using a laser beam with a power of about 3 joules.

10. A method as claimed in claim 8 further comprising using a laser beam with a power of between about 3–7 joules.

11. A method as claimed in claim 10 further comprising using a neodymium doped yttrium aluminum garnet (Nd:YAG) laser.

12. A method as claimed in claim 8 further comprising using an excimer type laser which uses a gaseous medium that lase in the ultraviolet regime.

13. A method as claimed in claim 12 wherein said coating comprises painting the surface with a paint suitable to generate the plasma.

14. A method as claimed in claim 13 wherein the laser beam is fired and the object moved so that the center points of adjacent spots in adjacent rows are offset from each other a generally equal amount in a direction along a line on which the center points are linearly aligned.

15. A method as claimed in claim 14 wherein each spot is hit more than one time using more than one set of said sequences.

16. A method as claimed in claim 15 wherein:
the object is a gas turbine engine blade having a leading edge and a trailing edge, the portion of the object is one of the edges, and the laser shock peened surface extends radially along at least a part of said one of the edges.

17. A method as claimed in claim 16 wherein said blade is a repaired blade.

18. A method as claimed in claim 16 further comprising simultaneously laser shock peening two laser shock peened surfaces each of which is on one of two sides of the blade by continuously moving the blade while continuously firing using two stationary ones of the laser beam on the portion of the blade, using the laser beams to vaporize material on the two surfaces of the portion of the blade with the pulses around the laser beam spots formed by the laser beam on the surfaces to form regions having deep compressive residual stresses extending into the blade from the laser shock peened surfaces, and flowing a curtain of water over the surfaces upon which the laser beam is firing while moving the blade until the laser shock peened surfaces are completely covered by laser beam spots at least once.

19. A method as claimed in claim 18 wherein the laser beams are fired and the blade moved so that the center points of adjacent spots in adjacent rows are offset from each other a generally equal amount in a direction along a line on which the center points are linearly aligned.

20. A method as claimed in claim 18 wherein the blade is moved linearly to produce at least one row of overlapping circular laser beam spots having generally equally spaced apart linearly aligned center points.

21. A method as claimed in claim 20 wherein the blade is moved and the laser beam is fired to produce more than one row of overlapping circular laser beam spots having generally equally spaced apart linearly aligned center points wherein adjacent rows of spots overlap.

* * * * *